United States Patent
Petranovich et al.

(10) Patent No.: US 11,133,862 B2
(45) Date of Patent: Sep. 28, 2021

(54) USING A LOW-LATENCY NETWORK TO ALLOCATE RETURN-LINK BANDWIDTH ON A HIGH-LATENCY NETWORK

(71) Applicant: ViaSat, Inc., Carlsbad, CA (US)

(72) Inventors: James E. Petranovich, La Jolla, CA (US); Matthew J. MacFreier, Oceanside, CA (US)

(73) Assignee: VIASAT, INC., Carlsbad, CA (US)

( * ) Notice: Subject to any disclaimer, the term of this patent is extended or adjusted under 35 U.S.C. 154(b) by 99 days.

(21) Appl. No.: 15/789,913

(22) Filed: Oct. 20, 2017

(65) Prior Publication Data

US 2019/0123812 A1    Apr. 25, 2019

(51) Int. Cl.
*H04B 7/185* (2006.01)
*H04L 12/801* (2013.01)
*H04W 28/20* (2009.01)
*H04W 72/12* (2009.01)
*H04L 12/911* (2013.01)
(Continued)

(52) U.S. Cl.
CPC ........ *H04B 7/18584* (2013.01); *H04L 47/14* (2013.01); *H04L 47/78* (2013.01); *H04W 28/20* (2013.01); *H04W 72/12* (2013.01); *H04B 7/18591* (2013.01); *H04W 84/06* (2013.01); *H04W 88/16* (2013.01)

(58) Field of Classification Search
None
See application file for complete search history.

(56) References Cited

U.S. PATENT DOCUMENTS

5,968,129 A * 10/1999 Dillon ................ H04B 7/18582
370/231
6,553,208 B1    4/2003 Worger et al.
(Continued)

FOREIGN PATENT DOCUMENTS

EP    1635482 A2    6/2008
EP    3188377 A1    7/2017
(Continued)

OTHER PUBLICATIONS

Courville et al., "Hybrid satellite/terrestrial networks: State of the art and future perspectives," DOI: 10.1145/1577776.1577777, Conference Paper, Jan. 2007, in 8 pages.
(Continued)

*Primary Examiner* — Gregory B Sefcheck
*Assistant Examiner* — Amarnauth G Persaud
(74) *Attorney, Agent, or Firm* — Chang & Hale LLP

(57) ABSTRACT

Described herein are systems, devices, and methods that improve network communication on a high-latency network by using a low-latency network to manage return-link bandwidth. Embodiments of the systems described herein include a user terminal that is communicatively coupled to a high-latency network and a low-latency network. The user terminal is configured to communicate with a gateway routing device over the low-latency network. The user terminal requests return-link bandwidth and the gateway routing device provides a transmission schedule to the user terminal over the low-latency network. The user terminal can be configured to transmit a message over the high-latency network using the scheduled return-link bandwidth.

24 Claims, 10 Drawing Sheets

(51) Int. Cl.
*H04W 84/06* (2009.01)
*H04W 88/16* (2009.01)

(56) References Cited

U.S. PATENT DOCUMENTS

| | | | |
|---|---|---|---|
| 6,724,737 B1* | 4/2004 | Boyden | H04B 7/18517 |
| | | | 370/316 |
| 6,931,512 B2 | 8/2005 | Dillon et al. | |
| 7,103,017 B2 | 9/2006 | Gutman et al. | |
| 7,477,597 B2 | 1/2009 | Segel | |
| 7,769,863 B2 | 8/2010 | Eidenschink | |
| 8,958,363 B2 | 2/2015 | Wu et al. | |
| 9,986,563 B2* | 5/2018 | Owen | H04L 47/762 |
| 2002/0003776 A1 | 1/2002 | Gokhale et al. | |
| 2002/0004369 A1* | 1/2002 | Kelly | H01Q 1/1257 |
| | | | 455/12.1 |
| 2002/0147011 A1* | 10/2002 | Kay | H04B 7/18584 |
| | | | 455/427 |
| 2005/0210122 A1 | 9/2005 | Taylor et al. | |
| 2007/0186251 A1 | 8/2007 | Horowitz et al. | |
| 2008/0144563 A1 | 6/2008 | Hart | |
| 2009/0290533 A1* | 11/2009 | Connors | H04B 7/18586 |
| | | | 370/316 |
| 2010/0091699 A1* | 4/2010 | Wu | H04W 28/20 |
| | | | 370/316 |
| 2010/0254707 A1* | 10/2010 | Peng | H04L 47/10 |
| | | | 398/58 |
| 2015/0289279 A1* | 10/2015 | Xu | H04W 72/0486 |
| | | | 370/329 |
| 2016/0028472 A1 | 1/2016 | Valencia | |
| 2016/0037434 A1 | 2/2016 | Gopal et al. | |
| 2016/0094467 A1* | 3/2016 | Hong | H04L 47/2441 |
| | | | 370/235 |
| 2016/0119938 A1 | 4/2016 | Frerking et al. | |
| 2016/0233950 A1* | 8/2016 | Chuberre | H04B 7/18578 |
| 2016/0234711 A1* | 8/2016 | Wang | H04L 67/1063 |
| 2018/0167321 A1* | 6/2018 | Foxworthy | H04L 61/1511 |
| 2018/0262419 A1* | 9/2018 | Ludin | H04L 61/6077 |
| 2018/0323863 A1* | 11/2018 | Bournes | H04B 7/18513 |
| 2020/0236062 A1* | 7/2020 | Dankberg | H04W 72/0446 |

FOREIGN PATENT DOCUMENTS

| | | |
|---|---|---|
| WO | 2001069397 A1 | 9/2001 |
| WO | 2008053483 A2 | 5/2008 |
| WO | 2008077061 A2 | 6/2008 |

OTHER PUBLICATIONS

Hu & Li, "Satellite-Based Internet: A Tutorial," IEEE Communications Magazine, Mar. 2001, in 9 pages.
O3b Networks, "What is Network Latency and Why Does It Matter?", www.o3bnetworks.com, retrieved Dec. 14, 2016, in 13 pages.
International Search Report and Written Opinion, PCT/US2018/055886, dated Dec. 17, 2018, in 10 pages.

* cited by examiner

USING A LOW-LATENCY NETWORK TO ALLOCATE RETURN-LINK BANDWIDTH ON A HIGH-LATENCY NETWORK

BACKGROUND

Field

The present disclosure relates to systems that use a low-latency network to allocate return-link bandwidth on a high-latency network.

Description of Related Art

Satellite networks can use geosynchronous satellites to provide connectivity to the Internet. Terrestrial networks, such as dial-up networks or cellular networks, can provide connectivity to the Internet using cables and/or wireless transmission of data. In certain areas, satellite networks can provide relatively high bandwidth connections for users where terrestrial networks may be lacking (e.g., in bandwidth, reliability, etc.).

SUMMARY

In a first aspect, a method is presented for allocating bandwidth on a high-latency network using a low-latency network. The method includes receiving, from a user terminal, a request for return-link bandwidth on the high-latency network, the request being received over the low-latency network. The method also includes determining an amount of return-link bandwidth on the high-latency network to allocate. The method also includes generating a schedule for return-link bandwidth based on the determined amount of return-link bandwidth. The method also includes transmitting the generated schedule to the user terminal over the low-latency network.

In some embodiments of the first aspect, the method also includes allocating a portion of the determined amount of return-link bandwidth for transmission over the low-latency network. In some embodiments of the first aspect, generating the schedule comprises determining a schedule for the return-link bandwidth that is compatible with schedules for other user terminals connected to the high-latency network. In some embodiments of the first aspect, the high-latency network has a latency that is greater than or equal to 200 ms. In some embodiments of the first aspect, the request includes a request for a particular amount of return-link bandwidth. In some embodiments of the first aspect, the determined amount of return-link bandwidth exceeds the requested amount of return-link bandwidth.

In a second aspect, a system is presented for implementing bandwidth scheduling in a satellite network using a low-latency network. The system includes a user terminal configured to send a request for bandwidth on the satellite network using the low-latency network. The system also includes a gateway routing device in communication with the user terminal via the low-latency network, the gateway routing device including a scheduler configured to receive the bandwidth request from the user terminal and to allocate return-link bandwidth on the satellite network for the user terminal, the gateway routing device configured to transmit the allocated return-link bandwidth to the user terminal.

In some embodiments of the second aspect, the scheduler is configured to determine a total amount of return-link bandwidth to allocate based on information included in the bandwidth request. In further embodiments of the second aspect, the scheduler is configured to allocate a portion of the determined total amount of return-link bandwidth for transmission over the low-latency network. In further embodiments of the second aspect, the scheduler is configured to schedule the allocated return-link bandwidth on the satellite network based at least in part on network congestion.

In some embodiments of the second aspect, the gateway routing device communicates the allocated return-link bandwidth to the user terminal over the low-latency network. In some embodiments of the second aspect, the gateway routing device communicates the allocated return-link bandwidth to the user terminal over the satellite network. In some embodiments of the second aspect, the scheduler is further configured to allocate a portion of the requested bandwidth for transmission on the low-latency network. In some embodiments of the second aspect, the low-latency network comprises a terrestrial communications system. In some embodiments of the second aspect, the low-latency network comprises a satellite communications system having a plurality of satellites in low earth orbit. In some embodiments of the second aspect, the low-latency network comprises a satellite communications system having a plurality of satellites in medium earth orbit.

In a third aspect, a method is presented for obtaining a schedule of return-link bandwidth on a satellite network. The method includes transmitting, to a gateway routing device, a request for return-link bandwidth on the satellite network, the request being transmitted over a terrestrial network that has a lower latency than the satellite network. The method also includes receiving, from the gateway routing device, a scheduled allocation of return-link bandwidth on the satellite network, the scheduled allocation being received over the terrestrial network. The method also includes transmitting a message over the satellite network according to the scheduled allocation.

In some embodiments of the third aspect, the scheduled allocation includes an allocation of bandwidth on the terrestrial network. In further embodiments of the third aspect, the method also includes transmitting a second message over the terrestrial network according to the allocation of bandwidth on the terrestrial network.

In some embodiments of the third aspect, the method also includes determining an amount of return-link bandwidth to request based at least in part on resources associated with a targeted web page.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION OF SOME EMBODIMENTS

Figure 1:
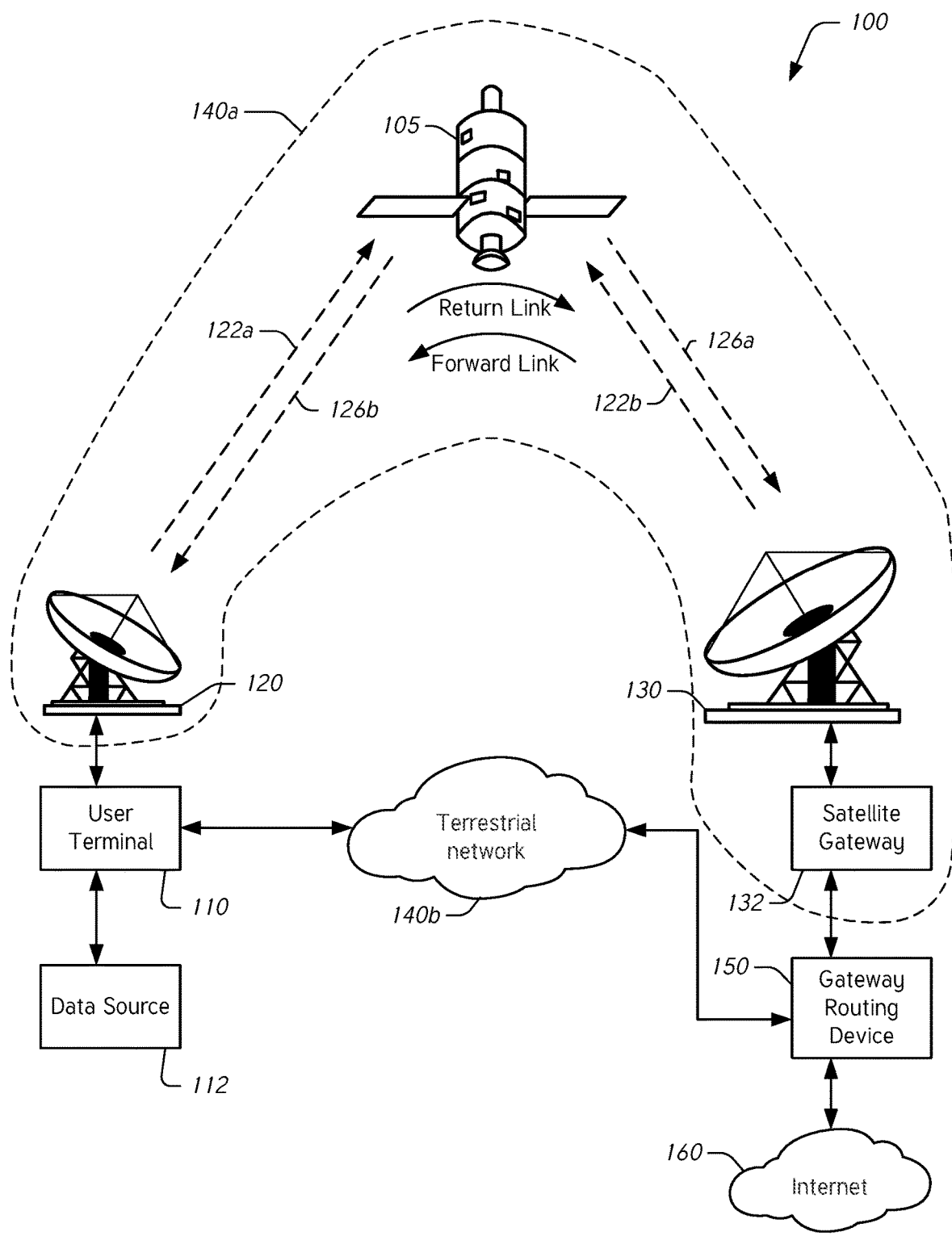
FIG. 1 illustrates a diagram of an example hybrid communication system that includes a satellite network and a terrestrial network.

The headings provided herein, if any, are for convenience only and do not necessarily affect the scope or meaning of the claimed invention.

Overview

Satellite communications systems have a travel delay (or physical latency) that arises due to the distance information travels from the ground to the satellite and back. The further the satellite is from the ground, the larger the physical latency. For geostationary satellites or satellites in geostationary orbits (GEO), the physical latency can be about 250 ms in one direction, or more than about 500 ms round trip. This latency can slow down network communication even where bandwidth provided by the satellite network is sufficient to provide network data in a timely manner. In particular, the latency of the satellite network can complicate scheduling return-link bandwidth for communication devices using the network, where the return link is the link from a user terminal over a satellite back to a network gateway. For example, a user application may be inconsistent in the amount of return link data it generates, making it difficult to schedule an appropriate return link bandwidth. If the system allocates too much bandwidth, capacity is wasted that a different device could use. If the system allocates too little bandwidth, the application must make multiple requests to get the data it needs thereby slowing down network communication due to the relatively large network latency, which may significantly slow applications on the user device.

A typical communication process flow for scheduling return-link bandwidth is as follows. When a user terminal has data to send on the return link of the satellite network, the user terminal sends a request to the gateway routing device for return-link bandwidth. The gateway routing device, or a scheduler on the gateway routing device, estimates the amount of return-link bandwidth the user terminal will need. The gateway routing device allocates the estimated return-link bandwidth to the user terminal and sends a transmission schedule to the user terminal. As stated above, it may take at least 500 ms between the request for bandwidth by the user terminal and receipt at the user terminal of the schedule allocating return-link bandwidth. To reduce the likelihood that the user terminal will need to make a second request for return-link bandwidth, the needed bandwidth may be overestimated (by even as much as three or four orders of magnitude). For example, the estimate may include not only the return-link bandwidth needed for the currently pending transmission from the user terminal, but for future transmissions expected to arise from the initial transmission as well. This may be illustrated in connection with an initial request for a Web page. A Web page typically includes many instructions for a user terminal to fetch numerous additional resources such as images and the like. When the user terminal requests the gateway routing device to schedule return-link bandwidth to transmit a request for a Web page, the estimated amount of return-link bandwidth can include not only the return-link bandwidth to transmit the initial request for the Web page, but bandwidth for additional requests for resources expected from the Web page.

Accordingly, described herein are systems, devices, and methods that improve network communication on a high-latency network by using a low-latency network to manage return-link bandwidth. Embodiments of the systems described herein include a user terminal that is communicatively coupled to a high-latency network (e.g., a satellite network) and a low-latency network (e.g., a terrestrial network). The user terminal is configured to communicate with a gateway routing device over the low-latency network. The user terminal requests return-link bandwidth and the gateway routing device provides a transmission schedule to the user terminal over the low-latency network. The user terminal can be configured to transmit a message (e.g., a request for data) over the high-latency network using the scheduled return-link bandwidth. By using the low-latency network for scheduling, multiple requests for return-link bandwidth do not necessarily add up to an unacceptable or undesirable delay. The disclosed systems and methods can be implemented in software, firmware, and/or hardware of a user terminal and/or the gateway routing device. In some embodiments, the disclosed embodiments support a mix of scheduling and control functionality using a combination of a low-latency network and a high-latency network.

The disclosed systems, devices, and methods provide a number of advantages that improve network communications systems that include a high-latency network. For example, individual requests for bandwidth can be based primarily on the needs for the currently pending transmission and can exclude estimates of speculative transmissions. This advantageously allows return-link bandwidth allocation to more closely approximate the bandwidth needs of the user terminals on the network, reducing wasted or unused bandwidth and reducing delays caused by multiple requests for return-link bandwidth. Typically, the amount of data required for scheduling is relatively small and the costs associated with transmitting that data over a low-latency network is relatively low. This lower latency advantageously enables the scheduler to improve its assessment of the appropriate amount of data to allocate on the return link. The disclosed systems and methods are of particular applicability where the cost of satellite data is lower or the satellite capacity is higher than the terrestrial network.

The disclosed systems and methods are configured to improve network communication. By using a low-latency network to provide scheduling communication, network communication is enhanced by reducing or eliminating delays present in higher latency networks. In some embodiments, the systems and methods do not necessarily direct latency-sensitive traffic to the low-latency network but rather reduce overall network communication delays. The systems and methods described herein can be configured to improve network communication by optimizing or balancing the tradeoffs between the cost per bit, availability of bandwidth, and network data speeds. In some embodiments, the disclosed embodiments do not necessarily prioritize bits or particular data, but rather aim to allocate resources efficiently to improve network communication performance. It should be understood, however, that the disclosed embodiments can be used in conjunction with systems and methods that direct latency-sensitive traffic to the low-latency network and/or with systems and methods that prioritize data by sending priority data over the low-latency network.

FIG. 1 illustrates a diagram of an example hybrid network environment 100. The hybrid network environment 100 includes a satellite network 140a and a terrestrial network 140b that work together to communicatively couple a user terminal 110 and a gateway routing device 150 to one another and to a network (such as the Internet 160). The satellite network 140a has a latency that is higher than the latency of the terrestrial network 140b. Accordingly, the hybrid network environment 100 provides a low-latency network (e.g., the terrestrial network 140b) and a high-latency network (e.g., the satellite network 140a).

The hybrid network environment 100 may utilize various network architectures that include space and ground segments. For example, the space segment may include one or more satellites, while the ground segment may include one or more satellite user terminals, gateway terminals, network operations centers (NOCs), satellite and gateway terminal command centers, and/or the like. Some of these elements are not shown in the figure for clarity. In some embodiments, the satellite network 140a includes one or more satellites in a geosynchronous orbit. In various embodiments, the terrestrial network 140b may be any type of network and may include, for example, the Internet, an IP network, an intranet, a wide-area network (WAN), a local-area network (LAN), a virtual private network (VPN), a public switched telephone network (PSTN), a public land mobile network, a digital subscriber line (DSL), a cellular network, wireless local area network (WLAN) access point (AP) connected to DSL, or any combination of these.

It should be understood that the terms low-latency and high-latency are used herein to indicate the relative latencies of the networks with respect to one another and not necessarily to a fixed threshold that divides high- and low-latency networks. It should also be noted that, while embodiments are described herein in the context of a satellite network environment, other types of network environments are possible. Generally, the systems and methods described herein are applicable in network environments that provide multiple network communication paths with different latencies and may be particularly beneficial in network environments where a high-latency network provides data at a lower cost per bit than a low-latency network. Thus, for example, the satellite network 140a can instead be another type of network such as a terrestrial network that has a greater latency than the network 140b. As another example, the terrestrial network 140b can be another type of network that has a lesser latency than network 140a. For example, both networks 140a and 140b can be satellite networks in which network 140a includes one or more satellites that have a greater latency than the one or more satellites of network 140b. For example, network 140a can include a geosynchronous earth orbit (GEO) satellite or satellites, and network 140b can include a medium earth orbit (MEO) satellite or satellites and/or a low earth orbit (LEO) satellite or satellites.

The user terminal 110 can include a router and can be configured to receive data from a data source 112. The data source 112 may be any one or more sources of data to be routed over the hybrid network environment 100, including any type of consumer premises equipment (e.g., a telephone, modem, router, computer, set-top box, and the like).

The user terminal 110 is configured to route data received from the data source 112 to the satellite network 140a (via a customer satellite transceiver 120) and/or to the terrestrial network 140b. The satellite network 140a includes a forward link for sending information from the gateway routing device 150 to the user terminal 110, and a return link for sending information from the user terminal 110 to the gateway routing device 150. The forward link includes a transmission path from the gateway routing device 150 through a satellite gateway 132 and its gateway satellite transceiver 130, through a satellite 105 via a satellite uplink channel 122b, to the customer satellite transceiver 120 via a satellite downlink channel 126b, and to the user terminal 110. The return link includes a transmission path from the customer satellite transceiver 120, to the satellite 105 via the satellite uplink channel 122a, to the gateway satellite transceiver 130 via the satellite downlink channel 126a, through the satellite gateway 132, and to the gateway routing device 150. Each transmission channel may utilize multiple satellites and transceivers.

The user terminal 110 is configured to communicate with the gateway routing device 150 to request return-link bandwidth on the satellite network 140a. The gateway routing device 150 determines a return-link bandwidth schedule and transmits it to the user terminal 110. These communications between the user terminal 110 and the gateway routing device 150 use the terrestrial network 140b to reduce latency.

When the scheduled return-link bandwidth arrives, the user terminal 110 transmits data to the gateway routing device 150 through the satellite network 140a via the return link. After reaching the gateway routing device 150 the data can then be directed to the Internet 160. Data from the Internet 160 can be sent to the user terminal 110 by the gateway routing device 150 via the forward link of the satellite network 140a or the terrestrial network 140b.

The gateway routing device 150 may be referred to as a hub or ground station. In certain embodiments, the gateway routing device 150 is configured or designed to service forward uplink signals 122b to a satellite 105, and to return downlink signals 126a from the satellite 105. The gateway routing device 150 may also schedule traffic to and/or from the user terminal 110. However, it is to be understood that the scheduling may be performed in other parts of the hybrid network environment 100 (e.g., at one or more NOCs, satellite gateways, and/or gateway command centers, which are not shown in this example).

The gateway routing device 150 may also provide an interface between the Internet 160 and the satellite 105 and/or the terrestrial network 140b. The gateway routing device 150 may receive data and information from the Internet 160 that is directed to the user terminal 110. The satellite gateway 132 and/or the gateway routing device 150 may format the data and information for delivery to the user terminal 110 via the satellite 105. The gateway routing device 150 may also receive signals carrying data and information from the satellite 105. This data and information may be transmitted by the user terminal 110 and directed to destinations accessible via the Internet 160. The satellite gateway 132 and/or the gateway routing device 150 may format this data and information for delivery via the Internet 160. The Internet 160 may connect the gateway routing device 150 with other gateway routing devices that may be in communication with the satellite 105 or with other satellites. In some embodiments, part or all of the gateway routing device 150 and/or the satellite gateway 132 can be located in a virtual device residing in a public or private computing cloud.

The satellite 105 may be a geosynchronous satellite that is configured to receive and transmit signals. The satellite 105 may receive the forward uplink signals 122*b* from the gateway routing device 150 and transmit one or more corresponding forward downlink signals 126*b* to one or more user terminals (e.g., user terminal 110). The satellite 105 may also receive one or more return uplink signals 122*a* from one or more user terminals (e.g., user terminal 110) and transmit corresponding return downlink signals 126*a* to the gateway routing device 150.

Scheduling Return-Link Bandwidth Using a Low-Latency Network

Figure 2:
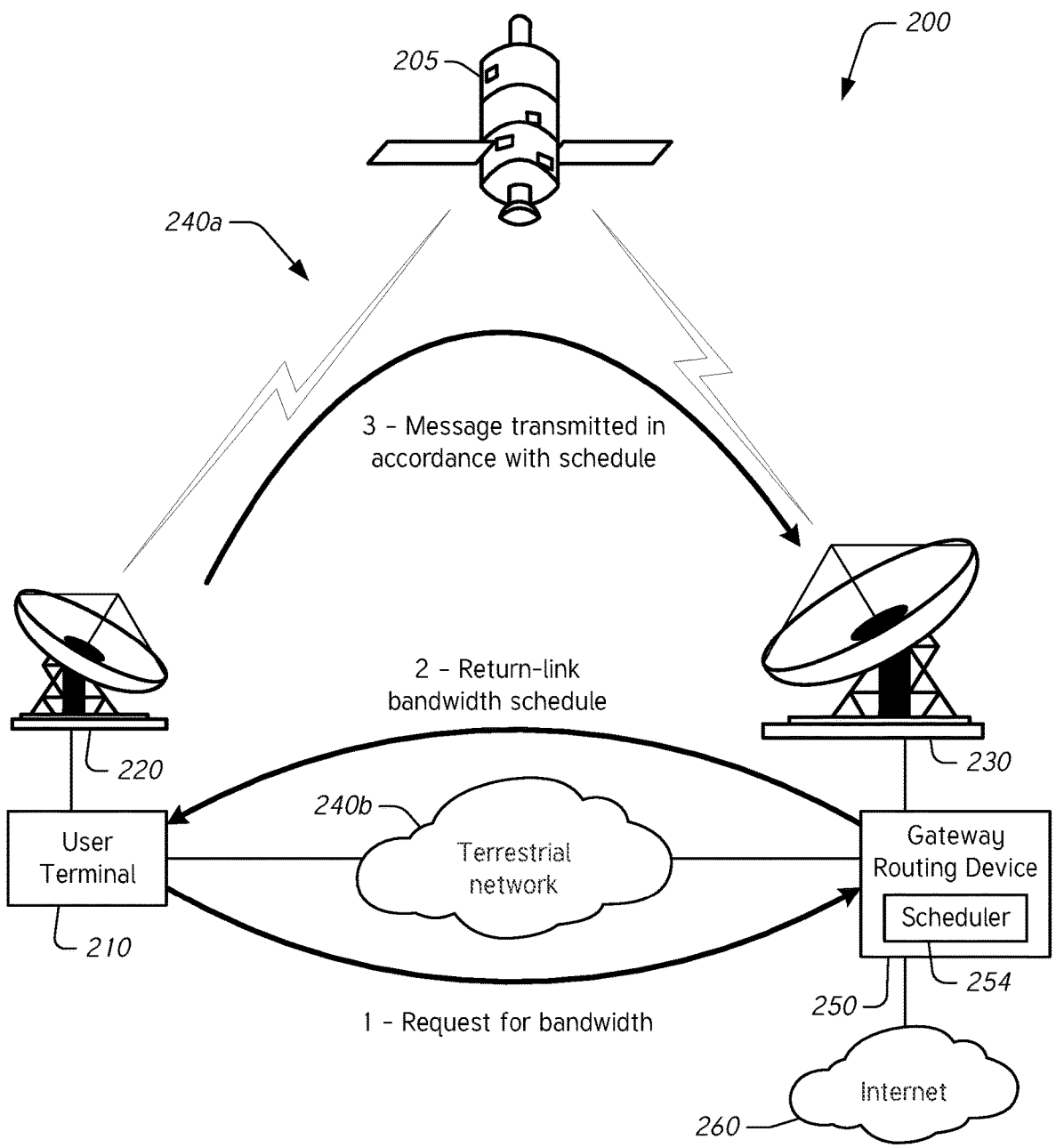
FIG. 2 illustrates a diagram of an example system that schedules return-link bandwidth on a satellite network using a low-latency network.

FIG. 2 illustrates a diagram of an example system 200 that schedules return-link bandwidth on a high-latency network (e.g., a satellite network 240*a*) using a low-latency network (e.g., a terrestrial network 240*b*). The networks 240*a* and 240*b* are not limited to satellite and terrestrial networks, respectively, but can be any of the types of networks described herein as examples of the networks 140*a* and 140*b* described herein with reference to FIG. 1. The satellite network 240*a* provides access to a network (such as the Internet 260) and includes a satellite 205, a customer satellite transceiver 220, and a gateway satellite transceiver 230 that form a communication link between a user terminal 210 and a gateway routing device 250 over a high-latency network. Similarly, the terrestrial network 240*b* forms a communication link between a user terminal 210 and the gateway routing device 250 and comprises a low-latency network. It should be understood that the systems and methods disclosed herein apply to any network environment having a high-latency network and a low-latency network and is not restricted solely to a combination of a satellite network and a terrestrial network.

The user terminal 210 is similar to the user terminal 110 described herein with reference to FIG. 1. The user terminal 210 can include a router and can be configured to receive data from a data source. The user terminal 210 is configured to route data to the satellite network 240*a* (via the customer satellite transceiver 220) and/or to the terrestrial network 240*b*. The satellite network 240*a* includes a forward link for sending information from the gateway routing device 250 to the user terminal 210, and a return link for sending information from the user terminal 210 to the gateway routing device 250. The forward link includes a transmission path from the gateway routing device 250 through the satellite 205 to the customer satellite transceiver 220 and to the user terminal 210. The return link includes a transmission path from the customer satellite transceiver 220 to the satellite 205 to the gateway satellite transceiver 230 and to the gateway routing device 250. Each transmission channel may utilize multiple satellites and transceivers.

The user terminal 210 is configured to communicate with the gateway routing device 250 to request return-link bandwidth on the satellite network 240*a*. The gateway routing device 250 determines a return-link bandwidth schedule and transmits it to the user terminal 210. These communications between the user terminal 210 and the gateway routing device 250 use the terrestrial network 240*b* to reduce latency.

The gateway routing device 250 is similar to the gateway routing device 150 described herein with reference to FIG. 1. The gateway routing device 250 can be configured to service forward link signals to the satellite 205, and to service return link signals from the satellite 205. The gateway routing device 250 may also schedule traffic to and/or from the user terminal 210. The gateway routing device 250 may also provide an interface between the Internet 260 and the satellite 205 and/or the terrestrial network 240*b*. The gateway routing device 250 may receive data and information from the Internet 260 that is directed to the user terminal 210. The gateway routing device 250 may also receive signals carrying data and information from the satellite 205. This data and information may be transmitted by the user terminal 210 and directed to destinations accessible via the Internet 260. The Internet 260 may connect the gateway routing device 250 with other gateway routing devices that may be in communication with the satellite 205 or with other satellites. In some embodiments, part or all of the gateway routing device 250 can be located in a virtual device residing in a public or private computing cloud.

The satellite 205 may be a geosynchronous satellite that is configured to receive and transmit signals. The satellite 205 may receive the forward link signals from the gateway routing device 250 and transmit one or more corresponding forward link signals to the user terminal 210. The satellite 205 may also receive one or more return link signals from the user terminal 210 and transmit corresponding return link signals to the gateway routing device 250.

The gateway routing device 250 includes a scheduler 254 configured to allocate bandwidth to user terminals on the network. Although not illustrated, the system 200 can include a plurality of user terminals 210. In some implementations, the system 200 is configured to use the scheduler 254 to manage the allocation of return-link bandwidth for more than 100 user terminals, more than 1000 user terminals, and/or more than 10,000 user terminals connected to the network.

Multiple user terminals 210 may request information from the Internet 260 through the gateway routing device 250 and satellite 205. Return-link bandwidth may be assigned to individual user terminals 210 by the scheduler 254. In some embodiments, the scheduler 254 can utilize a demand assigned multiple access (DAMA) scheduling model, an enhanced mobile satellite services (EMSS) scheduling model, and/or other scheduling techniques. In some embodiments, data may be transmitted from a particular user terminal 210 through the satellite 205 to the gateway routing device 250 using bandwidth requested by the user terminal 210 and allocated by the scheduler 254. Once allocated, the bandwidth may not be allocated to other user terminals. Accordingly, it is desirable to allocate sufficient bandwidth to accomplish the request of the user terminal and it is also desirable to not allocate an excess of bandwidth because that bandwidth may then be wasted. By transmitting allocation requests and responses over the low-latency network 240*b*, the scheduler 254 can increase the accuracy of bandwidth allocation as well as improve the responsiveness of its bandwidth allocation, thereby improving network performance.

An overview of the process for requesting and obtaining an allocation of return-link bandwidth is illustrated in FIG.

2. First, the user terminal 210 requests bandwidth on the return link of the satellite network 240a. Second, the gateway routing device 250 transmits a return-link bandwidth schedule to the user terminal, the schedule determined by the scheduler 254 based on the request of the user terminal 210. Third, the user terminal 210 transmits its intended message in accordance with the schedule determined by the scheduler 254 and transmitted by the gateway routing device 250. The user terminal 210 and the gateway routing device 250 communicate using the low-latency network 240b to determine the return-link bandwidth schedule.

By way of a more particular example, the process illustrated in FIG. 2 is now described in the context of requesting a web page. First, the user terminal 210 requests return-link bandwidth to transmit a request for a Web page. Second, the scheduler 254 determines an allocation and schedule for return-link bandwidth based on the request from the user terminal 210. The scheduled return-link bandwidth need not include bandwidth for all or even most of the possible additional resources the web page might cause the user terminal 210 to request. Rather, the scheduled bandwidth can be limited to the bandwidth needed by the user terminal 210 to transmit the request for the web page across the satellite 205 to the gateway routing device 250. In some implementations, the scheduled bandwidth may include return-link bandwidth for the request as well as requests for a few likely resource requests that will arise in the course of retrieving and rendering the requested web page. Third, the user terminal 210 requests the web page over the satellite network 240a according to the received schedule. As the web page is being rendered, additional resources may be requested that exceed the previously-scheduled return-link bandwidth. The user terminal 210 can initiate the process again and make additional requests for return-link bandwidth over the low-latency network 240b.

In some embodiments, the user terminal 210 can make multiple requests for return-link bandwidth over the low-latency network 240b. The scheduler 254 can be configured to process the multiple requests to determine one or more return-link bandwidth schedules to accomplish the multiple requests. In some implementations, the scheduler 254 can be configured to update an already determined schedule based on one or more subsequent requests from the user terminal 210. The user terminal 210 can receive the updated schedule over the low-latency network 240b and replace the existing schedule (if it still exists) or use the new schedule (if the prior schedule has already been fulfilled or passed).

In some embodiments, the system 200 is configured to support a combination of scheduling and control over the low-latency network 240b. The user terminal 210 and/or the gateway routing device 250 can be configured to communicate system control information over the low-latency network 240b which can include, for example and without limitation, network entry, wake-on-LAN, wake-on-demand, and the like.

The user terminal 210 includes one or more modules configured to generate the request for return-link bandwidth. The request mechanism can be configured to generate the request for the scheduler 254 and to transmit the request to the gateway routing device 250 over the low-latency network 240b.

Responsive to receiving a request for bandwidth allocation from the user terminal 210, the scheduler 254 analyzes the request, network status, network congestion, prior requests, similar requests, and the like to determine a schedule for return-link bandwidth. In some embodiments, the scheduler 254 is configured to generate the schedule based on a prediction or estimation of the actual bandwidth needed to accomplish the request. For example, if the user terminal 210 requests 100 bytes of return-link bandwidth, the scheduler 254 can allocate 500 bytes of return-link bandwidth based on an estimation of additional resources that are likely to be requested after the initial request of the user terminal. The scheduler 254 is configured to manage the bandwidth for a plurality of user terminals on the network and can generate individual schedules to avoid allocating overlapping bandwidth schedules to user terminals.

Figure 3:
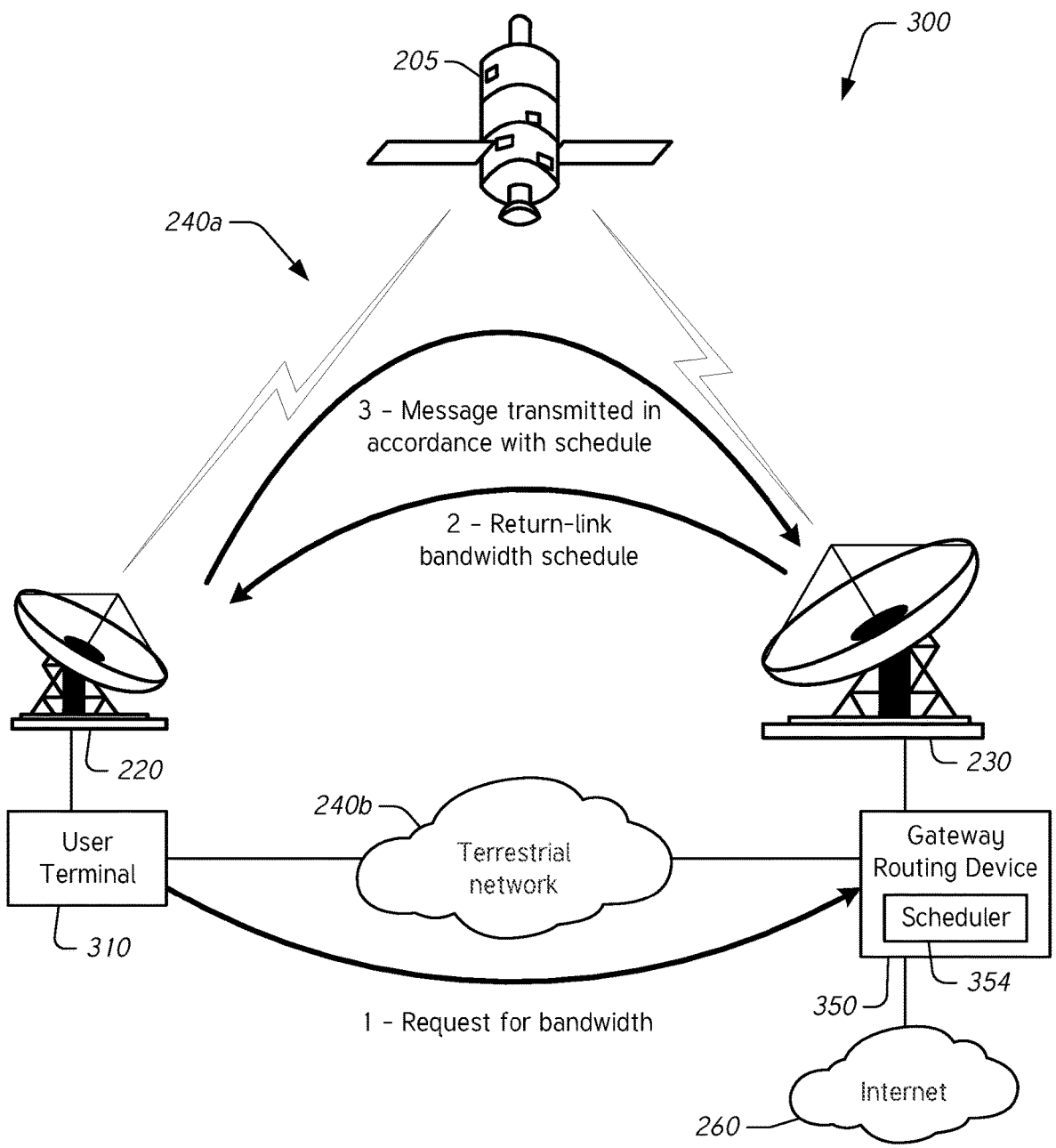
FIG. 3 illustrates a diagram of another example system that schedules return-link bandwidth on a satellite network using a low-latency network.

FIG. 3 illustrates a diagram of another example system 300 that schedules return-link bandwidth on the satellite network 240a using the low-latency network 240b. The system 300 illustrates another method of providing a requested schedule to a requesting user terminal 310. The user terminal 310 is configured to transmit data over the terrestrial network 240b. A gateway routing device 350 and a scheduler 354 are configured to receive the request and to generate a return-link bandwidth schedule, as described herein with respect to FIG. 2. However, the return-link bandwidth schedule is transmitted to the user terminal 310 over the satellite network 240a rather than the terrestrial network 240b.

This configuration may be beneficial where the user terminal 310 is not configured to receive transmissions from the gateway routing device 350 over the terrestrial network 240b (e.g., where the terrestrial network provides for one-way network traffic). Similarly, this configuration may be beneficial where a gateway routing device 350 is not configured to transmit data to the user terminal 310 over the terrestrial network 240b.

Accordingly, the system 300 is similar to the system 200 described herein with reference to FIG. 2 except that the user terminal 310, the gateway routing device 350, and the scheduler 354 are configured to provide additional or modified functionality from the corresponding user terminal 210, gateway routing device 250, and scheduler 254 of FIG. 2. For example, the user terminal 310 can be configured to transmit data across the low-latency network 240b but not to receive data over the low-latency network 240b. As another example, the gateway routing device 350 and the scheduler 354 are configured to transmit return-link bandwidth schedules over the satellite network 240a. However, it should be understood that the process described with reference to FIG. 3 may be implemented in any of the systems described herein with reference to FIGS. 1-6.

Figure 4:
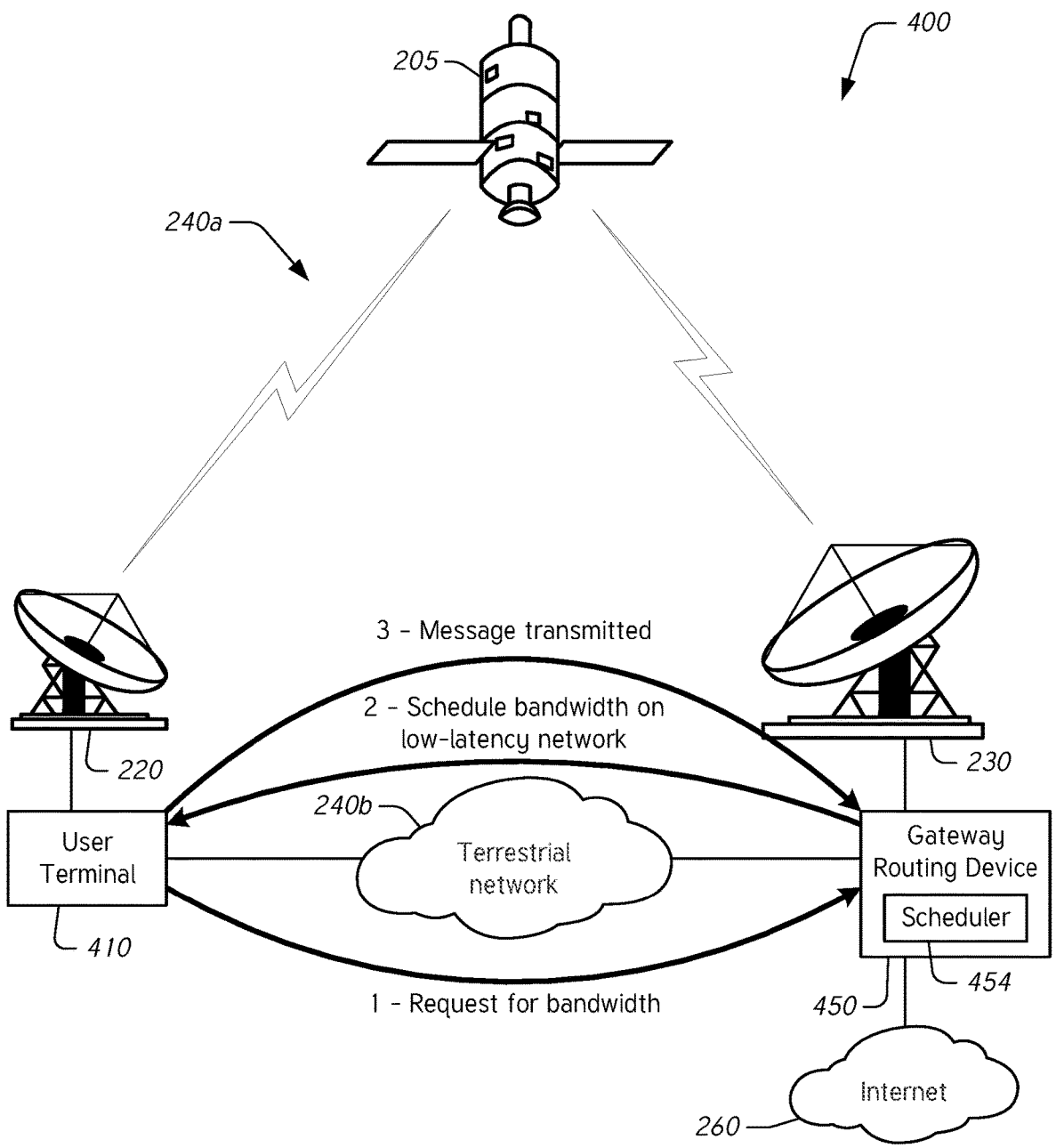
FIG. 4 illustrates a diagram of an example system that bypasses a satellite network to transmit messages over a low-latency network where certain criteria are met.

FIG. 4 illustrates a diagram of an example system 400 that bypasses a satellite network 240a to transmit messages over a low-latency network 240b where certain criteria are met. The system 400 illustrates another method of transmitting a message from the user terminal 410 rather than transmitting it over the satellite network 240a. The user terminal 410 is configured to transmit a request for return-link bandwidth on the satellite network 240a over the terrestrial network 240b. A gateway routing device 450 and a scheduler 454 are configured to receive the request and to generate a return-link bandwidth schedule that specifies or allows for the use of the terrestrial network 240b, rather than the satellite network 240a, when the user terminal transmits the message.

The scheduler 454 is configured to schedule return-link bandwidth over the terrestrial network 240b for the user terminal 410 when the request from the user terminal 410 fulfills particular requirements and/or where network congestion is in a particular state. For example, if the bandwidth being requested in the request from the user terminal is below a targeted or designated threshold, the scheduler 454 can be configured to allocate return-link bandwidth over the terrestrial network 240b instead of the satellite network 240a. The targeted threshold can be a static number or it can change, depending at least in part on network congestion, the number of user terminals connected to the network, the status of the satellite 205, and the like.

As another example, if network traffic on the low-latency network 240b is below a targeted or designated threshold, the scheduler 454 can be configured to allocate return-link bandwidth over the terrestrial network 240b instead of the satellite network 240a. Similarly, if network traffic on the high-latency network 240a is above a targeted or designated threshold, the scheduler 454 can be configured to allocate return-link bandwidth over the terrestrial network 240b instead of the satellite network 240a. The targeted threshold can be a static number or it can change, depending at least in part on network congestion, the number of user terminals connected to the network, the status of the satellite 205, and the like.

In addition, other criteria can be implemented by the scheduler 454 to determine whether to allocate return-link bandwidth for requests over the terrestrial network 240b. As described herein, the criteria can include requested bandwidth, network utilization or congestion, network status, data priority, quality of service metrics, or any combination of these or similar criteria.

Accordingly, the system 400 is similar to the system 200 described herein with reference to FIG. 2 except that the user terminal 410, the gateway routing device 450, and the scheduler 454 are configured to provide additional or modified functionality from the corresponding user terminal 210, gateway routing device 250, and scheduler 254 of FIG. 2. For example, the user terminal 410 can be configured to transmit messages across the low-latency network 240b in addition to requests for return-link bandwidth. As another example, the gateway routing device 350 and the scheduler 354 are configured to allocate return-link bandwidth over the low-latency network 240b in addition to the satellite network 240a. However, it should be understood that the process described with reference to FIG. 4 may be implemented in any of the systems described herein with reference to FIGS. 1-6.

Figure 5:
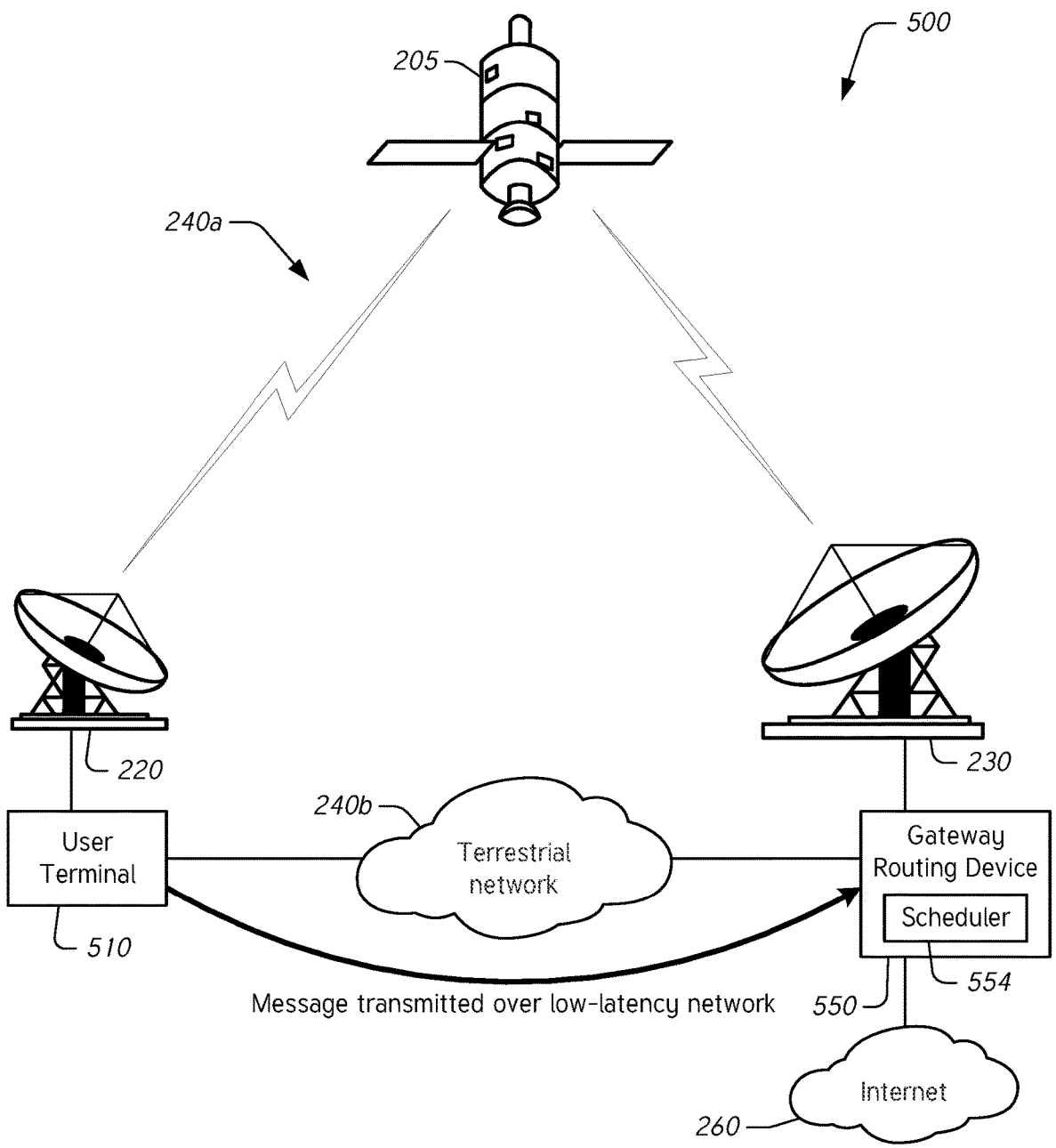
FIG. 5 illustrates a diagram of another example system that bypasses a satellite network to transmit messages over a low-latency network where certain criteria are met.

FIG. 5 illustrates a diagram of another example system 500 that bypasses a satellite network 240a to transmit messages over a low-latency network 240b where certain criteria are met. The system 500 illustrates another method of transmitting a message from the user terminal 510 rather than transmitting it over the satellite network 240a. The user terminal 510 is configured to transmit a message for bandwidth on the satellite network 240a over the terrestrial network 240b and this transmission can occur without a prior request for return-link bandwidth allocation from the scheduler 554. This can occur where the scheduler 554 allocates a plurality of return-link bandwidth schedules and the user terminal 510 transmits messages during subsequent schedules, the subsequent schedules being independent from the initial request from the user terminal 510 for return-link bandwidth. In some embodiments, the scheduler 554 can provide such a schedule where it determines, estimates, or predicts the user terminal 510 will require or request bandwidth in the future. The user terminal 510 can check the schedule allocated to the user terminal 510 prior to sending bandwidth requests to determine whether suitable bandwidth schedules are available for transmission over the low-latency network 240b. In some embodiments, the scheduler 554 can be configured to allocate such a schedule when the estimated future requests of the user terminal 510 fulfill the criteria discussed herein with respect to FIG. 4.

Accordingly, the system 500 is similar to the system 400 described herein with reference to FIG. 4 except that the user terminal 510, the gateway routing device 550, and the scheduler 554 are configured to provide additional or modified functionality from the corresponding user terminal 410, gateway routing device 450, and scheduler 454 of FIG. 4. For example, the user terminal 510 can be configured to transmit messages across the low-latency network 240b without requiring additional requests be made for return-link bandwidth. As another example, the gateway routing device 550 and the scheduler 554 are configured to allocate a plurality of return-link bandwidth schedules to the user terminal 510 allowing the user terminal 510 to transmit messages using a plurality of scheduled return-link bandwidth allocations. However, it should be understood that the process described with reference to FIG. 5 may be implemented in any of the systems described herein with reference to FIGS. 1-6.

Example Multi-Channel Network Environment

Figure 6:
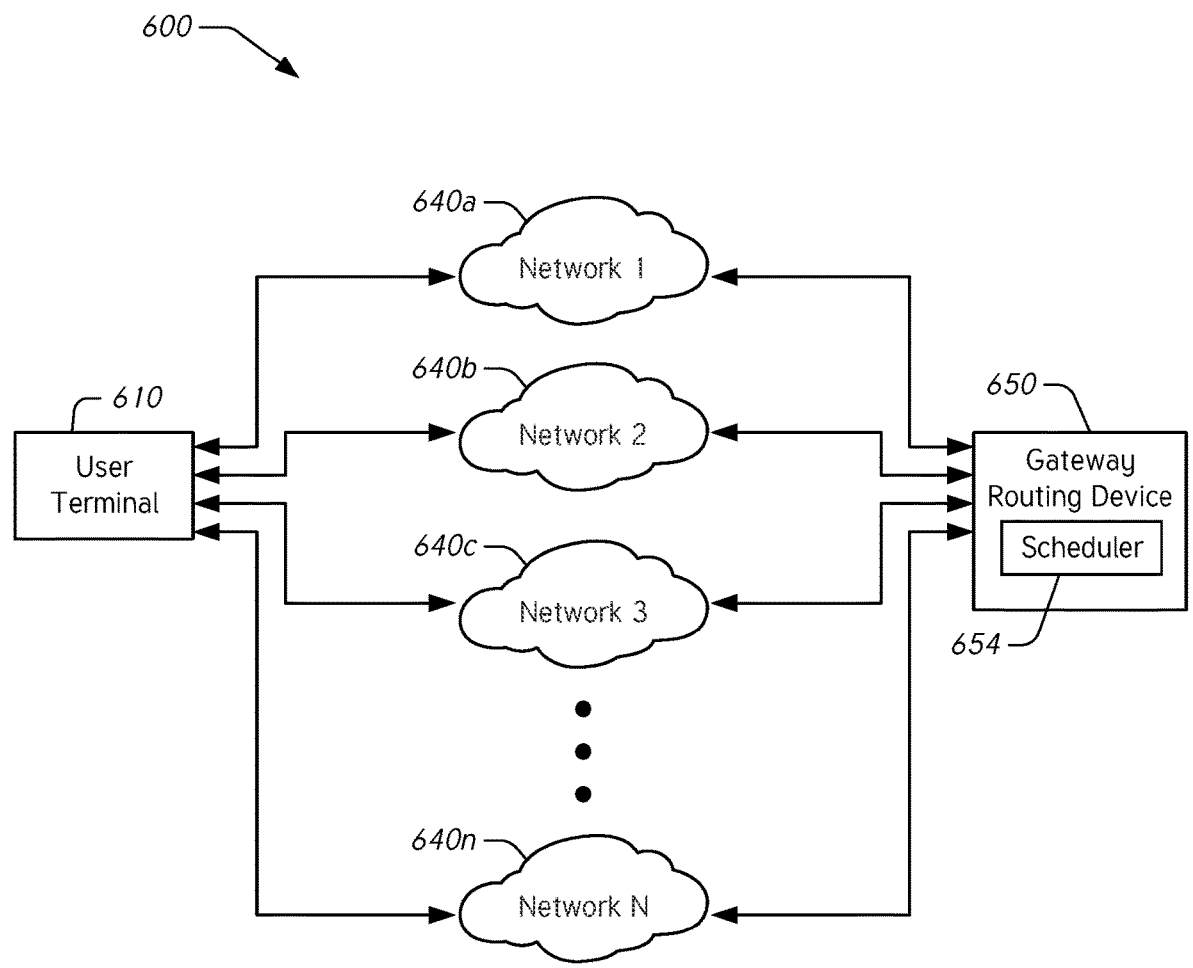
FIG. 6 illustrates a block diagram of an embodiment of a multi-channel network environment with both a user terminal and a gateway routing device.

FIG. 6 illustrates a block diagram of an embodiment of a multi-channel network environment 600 with both a user terminal 610 and a gateway routing device 650. The multi-channel network environment 600 includes a plurality of networks that provide corresponding communication links between the user terminal 610 and the gateway routing device 650. A first network 640a can have a first latency, a second network 640b can have a second latency that is larger than the first, a third network 640c can have a third latency that is larger than the second, and so on until an nth network 640n having a latency that is larger than any of the other network latencies.

The user terminal 610 is similar to the user terminal 110 described herein with reference to FIG. 1. The user terminal 610 can include a router and can be configured to receive data from a data source. The user terminal 610 is configured to communicate with the gateway routing device 650 to request return-link bandwidth on one or more of the high-latency networks 640a, 640b, 640c, 640n of the environment 600. The gateway routing device 650 determines a return-link bandwidth schedule and transmits it to the user terminal 610 using a low-latency network of the one or more the networks 640a, 640b, 640c, 640n to reduce latency.

The gateway routing device 650 is similar to the gateway routing device 150 described herein with reference to FIG. 1. The gateway routing device 650 can be configured to schedule traffic to and/or from the user terminal 610. The gateway routing device 650 may receive data and information that is directed to the user terminal 610. The gateway routing device 650 may also receive data and information transmitted by the user terminal 610 and directed to destinations accessible via the Internet or other network. In some embodiments, part or all of the gateway routing device 650 can be located in a virtual device residing in a public or private computing cloud.

The multi-channel network environment 600 illustrates that the systems and methods described herein can be implemented in an environment where a plurality of networks having different latencies provide communication links between a user terminal and a network (e.g., the Internet) through a gateway. For example, the user terminal 610 can request return-link bandwidth on the third network 640c and can transmit this request to the gateway routing device 650 over the first network 640a or the second network 640b. To generalize, the environment 600 can be configured so that the user terminal 610 transmits a request for return-link bandwidth on a network having a larger latency than the network used to transmit the request to the gateway routing device 650. Similarly, the gateway routing device 650 can be configured to transmit an allocated return-link bandwidth schedule for a network having a larger latency than the network used to transmit the allocated schedule to the user terminal 610. In some embodiments, the network (e.g., one of 640a, 640b, 640c, 640n) with the lowest latency is used to schedule return-link bandwidth on any of the other networks (e.g., any one of the others of 640a, 640b, 640c, 640n).

In some embodiments, a high-latency network has a latency that is greater than or equal to about 200 ms, a latency that is greater than or equal to about 300 ms, a latency that is greater than or equal to about 500 ms, or a latency that is greater than or equal to about 600 ms. In some embodiments, a ratio between a high-latency network and a low-latency network is greater than about 1.2, is greater than about 1.5, or is greater than about 2.

Figure 7:
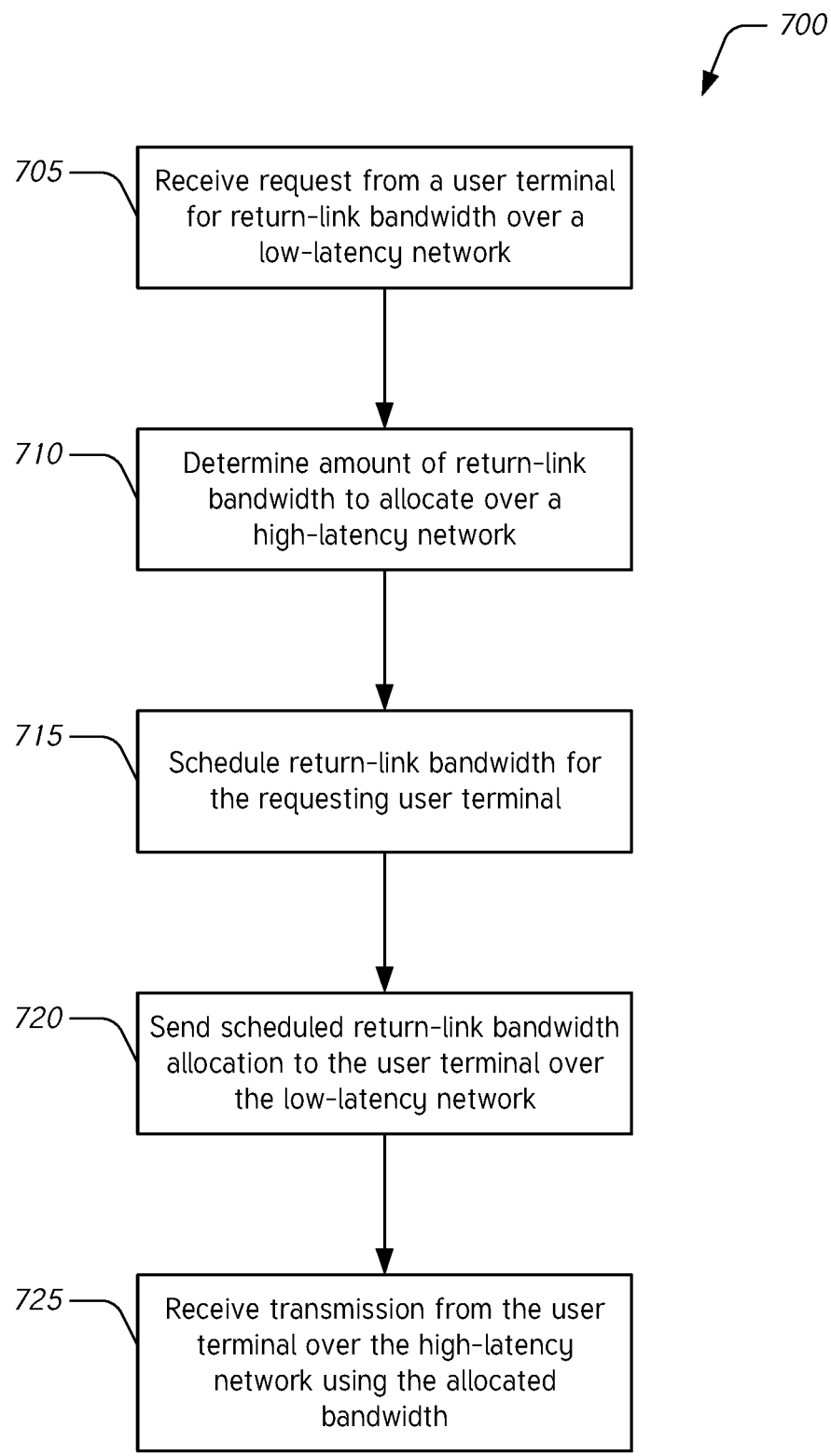
FIG. 7 illustrates a flow chart of an example method of allocating return-link bandwidth of a satellite network using a low-latency network.

One or more of the networks 640a, 640b, 640c, 640n of the environment 600 can be a terrestrial communications system comprising a terrestrial network. Similarly, one or more of the networks 640a, 640b, 640c, 640n of the environment 600 can be a satellite communications system having a plurality of satellites in low earth orbit. Likewise, one or more of the networks 640a, 640b, 640c, 640n of the environment 600 can be a satellite communications system having a plurality of satellites in medium earth orbit. Moreover, one or more of the networks 640a, 640b, 640c, 640n of the environment 600 can be a satellite communications system having a plurality of satellites in geosynchronous orbit Example Methods for Allocating Return-Link Bandwidth FIG. 7 illustrates a flow chart of an example method 700 of allocating return-link bandwidth of a high-latency network using a low-latency network. The method 700 can be performed in any of the systems described herein with reference to FIGS. 1-6. The method 700 can be performed by a gateway (which, as noted, can be located in a public or private computing cloud), such as any of the gateway routing devices described herein with reference to FIGS. 1-6; by a scheduler, such as any of the schedulers described herein with reference to FIGS. 2-6; by a combination of a gateway routing device and a scheduler; or by one or more components in a hybrid network upstream from a user terminal. However, for ease of description, the method 700 will be described as being performed by a scheduler. This is not to be understood to limit the scope of the disclosure. Rather, any step or portion of the method 700 can be performed by any component or combination of components of the networks described herein.

In block 705, the scheduler receives, from a user terminal, a request for return-link bandwidth on a high-latency network, the request being received over a low-latency network. For example, the requested return-link bandwidth can be for transmitting a message from the user terminal over the high-latency network to a gateway routing device. The scheduler can be coupled to the low-latency network and to the high-latency network. The scheduler can be configured to manage bandwidth scheduling on the high-latency network and, in some embodiments, on the low-latency network. In various implementations, the high-latency network can include a satellite network. In certain implementations, the low-latency network can include a terrestrial network. The request from the user terminal can include a requested amount of return-link bandwidth.

In block 710, the scheduler determines an amount of return-link bandwidth to allocate over the high-latency network. The scheduler can be configured to analyze the request, including the requested amount of bandwidth, to determine an amount of return-link bandwidth to allocate to the user terminal to fulfill the request. The scheduler can be configured to analyze current network conditions, past requests, concurrent requests, databases, and the like to determine the return-link bandwidth allocation. Examples of predictive allocation schedulers are provided in greater detail in U.S. Pat. No. 7,769,863, issued Aug. 3, 2010, entitled "Network Accelerator for Controlled Long Delay Links," and U.S. Pat. No. 8,958,363, issued Feb. 17, 2015, entitled "Profile-Based Bandwidth Scheduler," the entire contents of each of which is incorporated herein by reference.

In block 715, the scheduler schedules return-link bandwidth for the requesting user terminal. The scheduler analyzes network conditions and schedules for other user terminals connected to the network to provide a schedule for transmission over the return link for the requesting user terminal. The scheduler is configured to manage bandwidth allocation for a plurality of user terminals coupled to the network. In some embodiments, the number of user terminals can exceed about 10,000 user terminals.

In block 720, the scheduler sends the scheduled return-link bandwidth allocation to the user terminal over the low-latency network. In block 725, a gateway routing device receives a transmission (e.g., the message described above with respect to block 705) from the user terminal over the high-latency network using the bandwidth allocation. Accordingly, the request for return-link bandwidth and the allocation of return-link bandwidth are communicated over a low-latency network whereas the allocated return-link bandwidth is on and the subsequent message transmission is communicated on a high-latency network.

Figure 8:
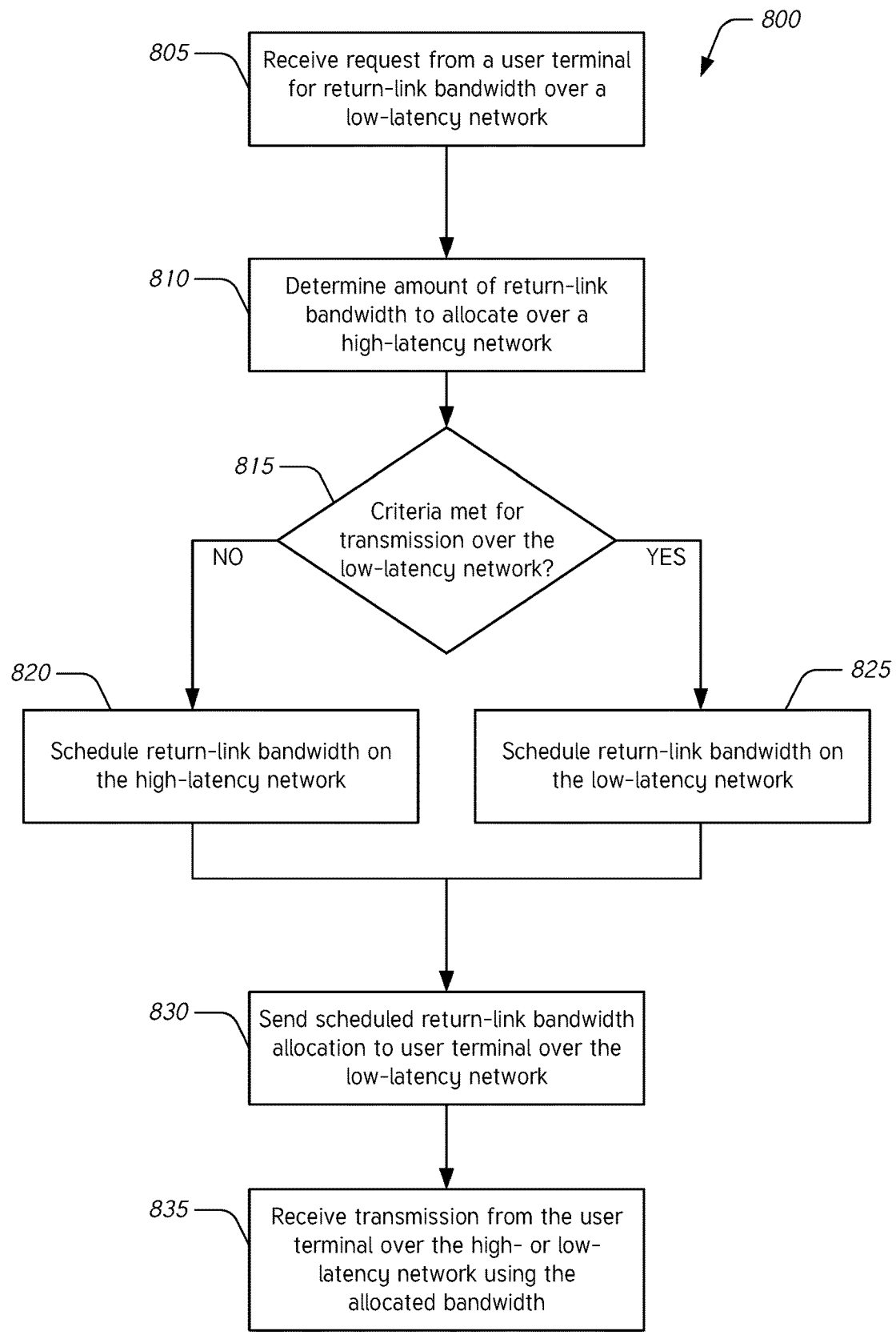
FIG. 8 illustrates a flow chart of an example method of allocating return-link bandwidth between a satellite network and a low-latency network.

FIG. 8 illustrates a flow chart of an example method 800 of allocating return-link bandwidth between a satellite network and a low-latency network. The method 800 can be performed in an of the systems described herein with reference to FIGS. 1-6. The method 800 is similar to the method 700 and will thus be described as being performed by the scheduler. However, it is to be understood that the method 800 can be performed by a gateway (e.g., the gateway routing devices of any of FIGS. 1-6), a scheduler (e.g., the schedulers of any of FIGS. 2-6), a combination of the two, or by one or more components in a hybrid network upstream from a user terminal. The method 800 includes criteria to determine whether to schedule return-link bandwidth over the high-latency network or the low-latency network to improve network communication.

In block 805, the scheduler receives, from a user terminal, a request for return-link bandwidth on a high-latency network, the request being received over a low-latency network. For example, the return-link bandwidth can be for transmitting a message from the user terminal over the high-latency network to a gateway routing device. The scheduler can be configured to manage bandwidth scheduling on the high-latency network and on the low-latency network. The request from the user terminal can include a requested amount of return-link bandwidth.

In block 810, the scheduler determines an amount of return-link bandwidth to allocate. The scheduler can be configured to analyze the request, including the requested amount of return-link bandwidth, to determine an amount of bandwidth to allocate to the user terminal to fulfill the request. The scheduler can be configured to analyze current network conditions, past requests, concurrent requests, databases, and the like to determine the return-link bandwidth allocation.

In block 815, the scheduler determines whether criteria are met to enable the scheduler to allocate return-link bandwidth over the low-latency network rather than the high-latency network. In some embodiments, the criteria include the amount of return-link bandwidth being requested. In various embodiments, the criteria include the congestion of the high-latency network and/or the congestion of the low-latency network. As described herein, the criteria can include requested return-link bandwidth, network utilization or congestion, network status, data priority, quality of service metrics, or any combination of these or similar criteria.

If the criteria are not met, the scheduler schedules return-link bandwidth on the high-latency network in block 820, similar to block 715 of the method 700 described herein with reference to FIG. 7. If the criteria are met, the scheduler schedules return-link bandwidth on the low-latency network in block 825. The scheduler analyzes network conditions and schedules for other user terminals connected to the network to provide a schedule for return-link transmission for the requesting user terminal.

In block 830, the scheduler sends the scheduled return-link bandwidth allocation to the user terminal over the low-latency network. Accordingly, the request for return-link bandwidth and the allocation of return-link bandwidth are communicated over a low-latency network and the allocated bandwidth is on and subsequent message transmission is communicated on a high-latency network or the low-latency network. In block 835, a gateway routing device receives a transmission (e.g., the message mentioned above with respect to block 805) from the user terminal over the high-latency network or the low-latency network using the allocated return-link bandwidth.

Figure 9:
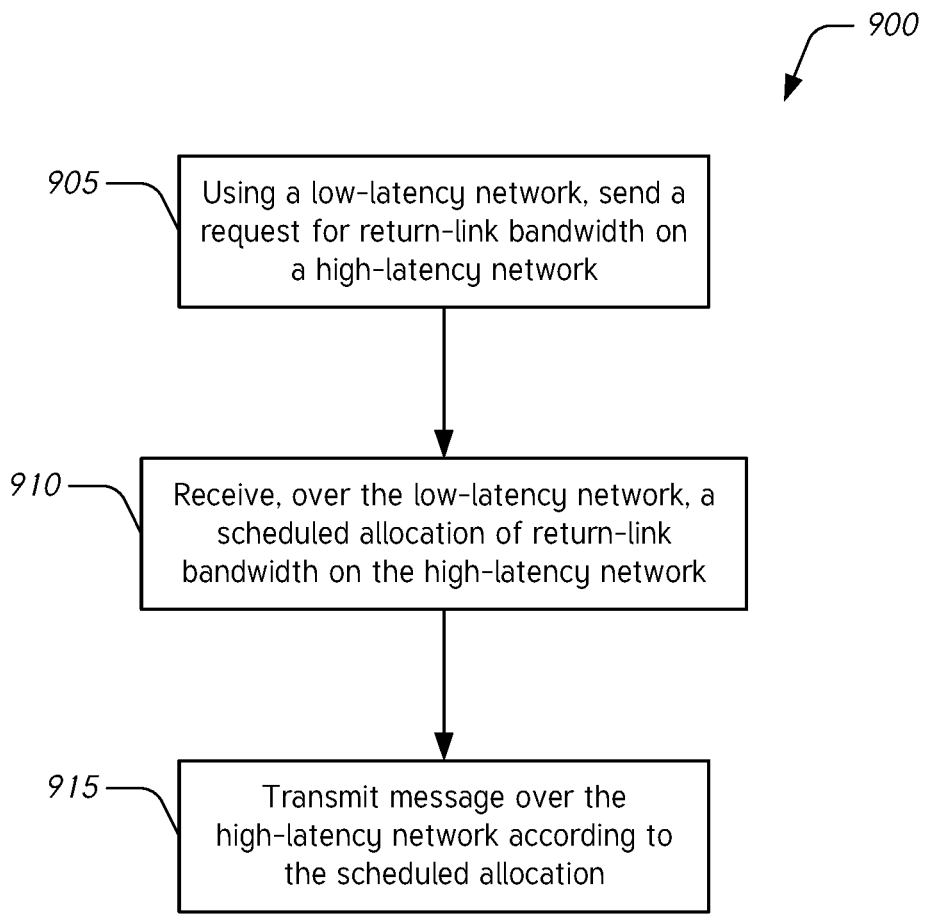
FIG. 9 illustrates a flow chart of an example method of requesting return-link bandwidth of a high-latency network using a low-latency network.

FIG. 9 illustrates a flow chart of an example method 900 of requesting return-link bandwidth of a high-latency network using a low-latency network. The method 900 can be performed in any of the systems described herein with reference to FIGS. 1-6. The method 900 can be performed by a user terminal, such as any of the user terminals described herein with reference to FIGS. 1-6, or a requesting mechanism of a user terminal. However, for ease of description, the method 900 will be described as being performed by the user terminal. This is not to be understood to limit the scope of the disclosure. Rather, any step or portion of the method 900 can be performed by any component or combination of components of the networks described herein.

In block 905, the user terminal transmits a request for return-link bandwidth on a high-latency network, the transmission being accomplished using a low-latency network. The request can include a request for a particular amount of bandwidth, a uniform resource locator (URL), a communication protocol, a priority, and/or other information to be used by a scheduler to determine a bandwidth schedule for the user terminal. The return-link bandwidth can be, for example, for transmitting a message from the user terminal over the high-latency network to a gateway routing device.

In block 910, the user terminal receives, over the low-latency network, a scheduled allocation of return-link bandwidth on the high-latency network. In block 915, the user terminal transmits a message (e.g., the message mentioned above with respect to block 905) over the high-latency network using the allocated return-link bandwidth according to the scheduled allocation. Accordingly, the user terminal is configured to request return-link bandwidth and to receive a schedule of allocated return-link bandwidth over a network of lower latency than the network for which return-link bandwidth was requested. This can be done to reduce network communication delays resulting from multiple bandwidth allocation requests performed over a high-latency network.

Figure 10:
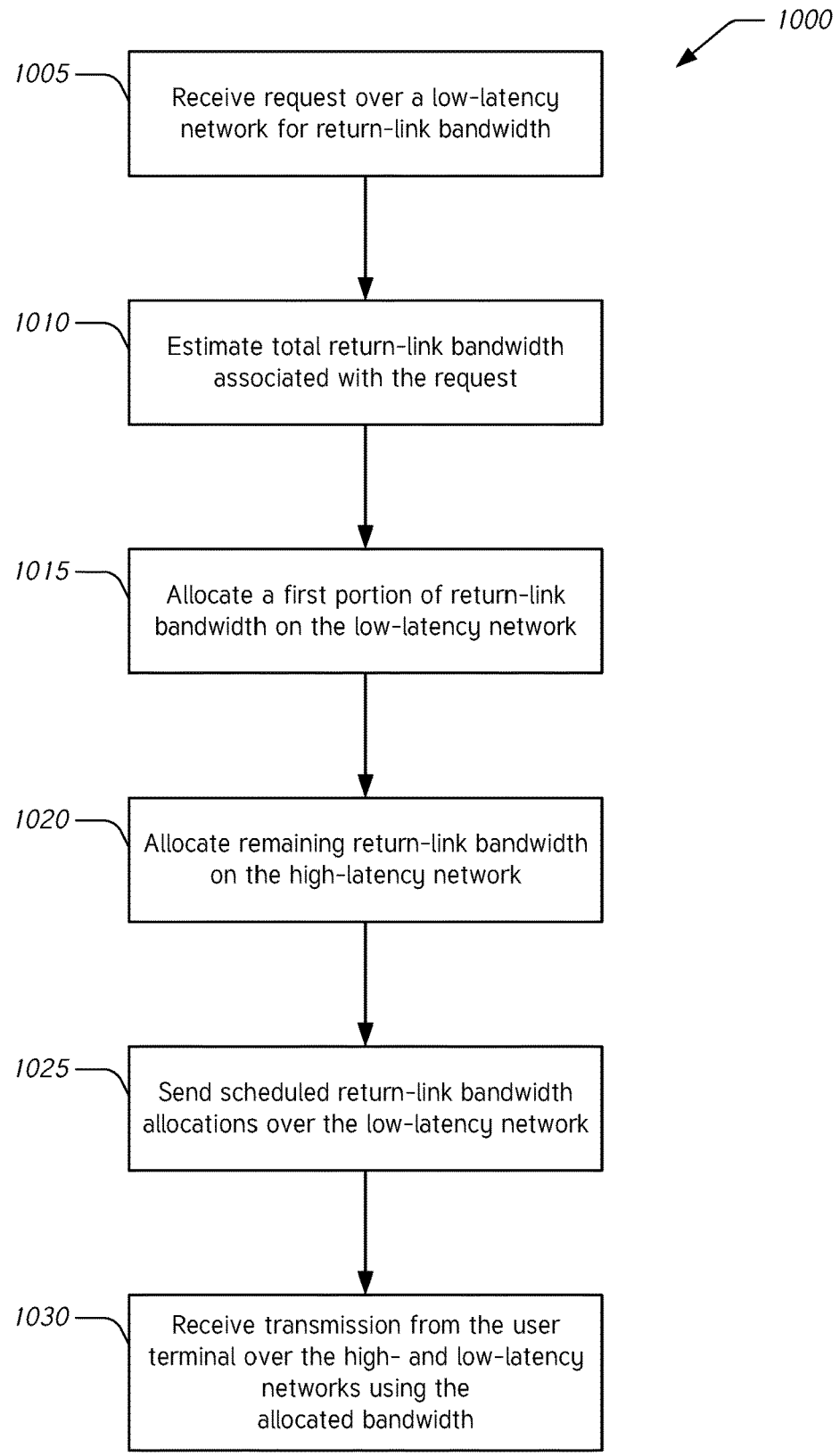
FIG. 10 illustrates a flow chart of an example method of splitting return-link bandwidth for a user terminal between a high-latency network and a low-latency network.

FIG. 10 illustrates a flow chart of an example method 1000 of splitting return-link bandwidth for a user terminal between a high-latency network and a low-latency network. The method 1000 can be performed in any of the systems described herein with reference to FIGS. 1-6. The method 1000 is similar to the method 700 and the method 800 and will thus be described as being performed by the scheduler. However, it is to be understood that the method 1000 can be performed by a gateway routing device (e.g., the gateway routing devices of any of FIGS. 1-6), a scheduler (e.g., the schedulers of any of FIGS. 2-6), a combination of the two, or by one or more components in a hybrid network upstream from a user terminal. The method 1000 includes allocating return-link bandwidth on two different networks of different latencies to enhance network communication.

In block 1005, the scheduler receives, from a user terminal, a request for return-link bandwidth, the request being received over a low-latency network. The scheduler can be configured to manage bandwidth scheduling on the high-latency network and on the low-latency network. The request from the user terminal can include a requested amount of return-link bandwidth. The return-link bandwidth can be, for example, for transmitting a message from the user terminal over the high-latency network to a gateway routing device.

In block 1010, the scheduler estimates a total amount of return-link bandwidth to allocate for the request. The scheduler can be configured to analyze the request, including the requested amount of bandwidth, to determine a total amount of bandwidth to allocate to the user terminal to fulfill the request. The scheduler can be configured to analyze current network conditions, past requests, concurrent requests, databases, and the like to determine the bandwidth allocation.

In block 1015, the scheduler allocates a first portion of return-link bandwidth on the low-latency network. In block 1020, the scheduler allocates a remainder of the return-link bandwidth on the high-latency network. The allocation of return-link bandwidth between the low-latency network and the high-latency network can be based at least in part on timing of the request. For close-in-time return-link bandwidth requests, the scheduler can allocate bandwidth on the low-latency network to fulfill such requests. For other requests that are more remote in time, bandwidth on the high-latency network can be allocated. Similarly, weighting algorithms can be used to determine which portion or fraction of the return-link bandwidth to allocate on the low-latency network. A factor in this division can be the congestion or utilization of the low-latency network. For example, it may be important to maintain a targeted percentage of the low-latency network available to fulfill spikes in requests from user terminals or other similar conditions. In some embodiments, the scheduler can be configured to allocate return-link bandwidth on the high-latency network to reserve bandwidth on that network for the user terminal. This can be done where the scheduler predicts that the user terminal will need return-link bandwidth at a particular time or within a particular time frame.

In block 1025, the scheduler sends the scheduled return-link bandwidth allocation to the user terminal over the low-latency network. In block 1030, a gateway routing device receives a transmission (e.g., the message mentioned above with respect to block 1005) from the user terminal over the high-latency network and the low-latency network using the bandwidth allocations. Accordingly, the request for return-link bandwidth and the allocation of return-link bandwidth are communicated over a low-latency network and the allocated return-link bandwidth is distributed across the high-latency network and the low-latency network.

Terminology

As used herein, the term latency includes but is not limited to delays incurred in the processing of network data and physical latency can refer to delays that arise primarily due to physical limitations of transmitting electromagnetic energy over distances. The term high latency or high-latency network refers to a network that has a relatively high latency, such as a satellite communications system that includes geostationary satellites. The term low latency or low-latency refers to a network that has a relatively low latency, such as terrestrial networks. As stated herein, however, the terms high-latency network and low-latency network can be relative to each other such that a first network that has a latency that is substantially larger than a second network can be referred to as a high-latency network whereas the second network is referred to as a low-latency network.

As used herein, the term return-link is used to indicate a direction of communication from a user terminal towards a network core such as a gateway routing device. Generally, return-link refers to communication from an earth station to a satellite, or from a device to a base station, or from data communication equipment toward a network core. Similarly, a forward link is used to herein to mean communication in a direction opposite to the return-link.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for allocating bandwidth on a high-latency network using a low-latency network, the method comprising:
    receiving, from a user terminal, a request for return-link bandwidth on the high-latency network, the request being received over the low-latency network;
    determining, in response to the received request, an amount of return-link bandwidth to allocate;
    generating a schedule for return-link bandwidth based on the determined amount of return-link bandwidth, the schedule including a first allocation of return-link bandwidth on the high-latency network and a second allocation of return-link bandwidth on the low-latency network responsive to determining that the determined amount of return-link bandwidth exceeds a designated return-link bandwidth threshold, otherwise the schedule including an allocation of the entire amount of determined return-link bandwidth on the low-latency network; and
    transmitting the generated schedule to the user terminal over the low-latency network.

2. The method of claim 1 wherein generating the schedule comprises determining a schedule for the return-link bandwidth that is compatible with schedules for other user terminals connected to the high-latency network.

3. The method of claim 1 wherein the high-latency network has a latency that is greater than or equal to 200 ms.

4. The method of claim 1 wherein the request includes a request for a particular amount of return-link bandwidth.

5. The method of claim 1 wherein the determined amount of return-link bandwidth exceeds the requested amount of return-link bandwidth.

6. The method of claim 1 wherein the second allocation of return-link bandwidth is not based on the request indicating that it includes latency-sensitive traffic.

7. The method of claim 1 wherein the low-latency network comprises a satellite communications system having a satellite in low earth orbit.

8. The method of claim 1 wherein the low-latency network comprises a satellite communications system having a satellite in medium earth orbit.

9. A system for implementing bandwidth scheduling in a satellite network using a low-latency network, the system comprising:
    a user terminal configured to send a request for return-link bandwidth on the satellite network using the low-latency network; and
    a gateway routing device in communication with the user terminal via the low-latency network, the gateway routing device including a scheduler configured to receive the bandwidth request from the user terminal and, in response to the request for bandwidth, to allocate return-link bandwidth for the user terminal, the allocated return-link bandwidth including a first allocation of bandwidth on the satellite network and a second allocation of bandwidth on the low-latency network responsive to the allocated return-link bandwidth exceeding a designated return-link bandwidth threshold, otherwise the entire allocation of return-link bandwidth being on the low-latency network, the gateway routing device configured to transmit the allocated return-link bandwidth to the user terminal.

10. The system of claim 9 wherein the scheduler is configured to determine a total amount of return-link bandwidth to allocate based on information included in the bandwidth request.

11. The system of claim 10 wherein the scheduler is configured to allocate the second allocation of bandwidth for transmission over the low-latency network, the second allocation of bandwidth not based on the request indicating that it includes latency-sensitive traffic.

12. The system of claim 11 wherein the scheduler is configured to schedule the allocated return-link bandwidth on the satellite network based at least in part on network congestion.

13. The system of claim 9 wherein the gateway routing device communicates the allocated return-link bandwidth to the user terminal over the low-latency network.

14. The system of claim 9 wherein the gateway routing device communicates the allocated return-link bandwidth to the user terminal over the satellite network.

15. The system of claim 9 wherein the low-latency network comprises a terrestrial communications system.

16. The system of claim 9 wherein the low-latency network comprises a satellite communications system having a satellite in low earth orbit.

17. The system of claim 9 wherein the low-latency network comprises a satellite communications system having a satellite in medium earth orbit.

18. A method for obtaining a schedule of return-link bandwidth on a satellite network, the method comprising:
   transmitting, to a gateway routing device, a request for return-link bandwidth on the satellite network, the request being transmitted over a low-latency network that has a lower latency than the satellite network;
   receiving, from the gateway routing device, a scheduled allocation of return-link bandwidth, the scheduled allocation including a first allocation of return-link bandwidth on the satellite network and a second allocation of return-link bandwidth on the low-latency network responsive to the scheduled allocation of return-link bandwidth exceeding a designated return-link bandwidth threshold, otherwise the scheduled allocation including return-link bandwidth on the low-latency network and not the satellite network, the scheduled allocation being received over the low-latency network; and
   transmitting a message according to the scheduled allocation.

19. The method of claim 18 wherein the second allocation of return-link bandwidth is not based on the request indicating that it includes latency-sensitive traffic.

20. The method of claim 18 further comprising transmitting a second message over the low-latency network according to the second allocation of return-link bandwidth.

21. The method of claim 18 further comprising determining an amount of return-link bandwidth to request based at least in part on resources associated with a targeted web page.

22. The method of claim 18 wherein the scheduled allocation of return-link bandwidth is based at least in part on network congestion on the satellite network and on the low-latency network.

23. The method of claim 18 wherein the low-latency network comprises a satellite communications system having a satellite in low earth orbit.

24. The method of claim 18 wherein the low-latency network comprises a satellite communications system having a satellite in medium earth orbit.

* * * * *